(No Model.) 2 Sheets—Sheet 1.

F. WHITNEY.
PHOTOGRAPHIC CAMERA.

No. 446,045. Patented Feb. 10, 1891.

Witnesses:
Frank S. Blanchard
C. W. Whitney

Inventor:
Frank Whitney (No Model.) 2 Sheets—Sheet 2.
F. WHITNEY.
PHOTOGRAPHIC CAMERA.
No. 446,045. Patented Feb. 10, 1891.
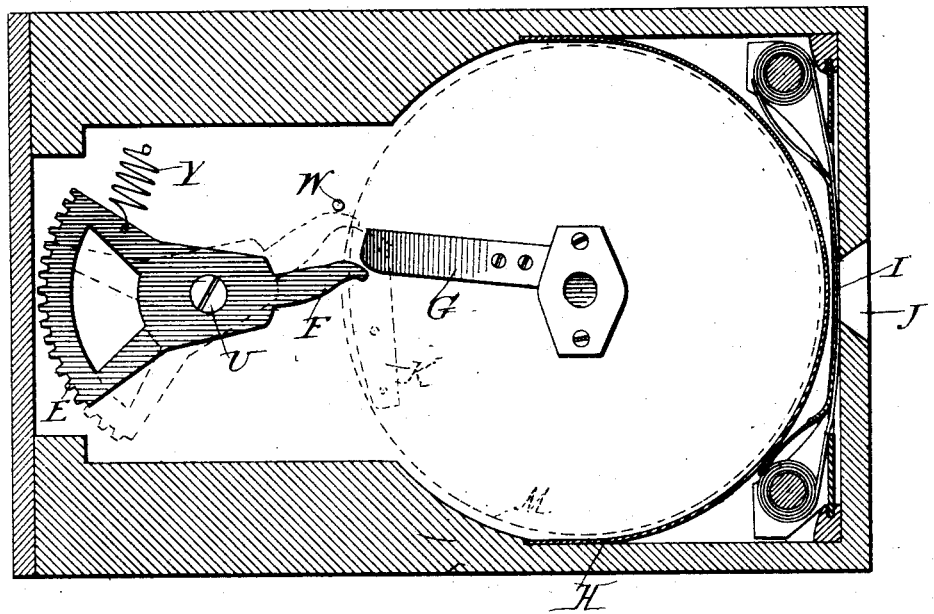
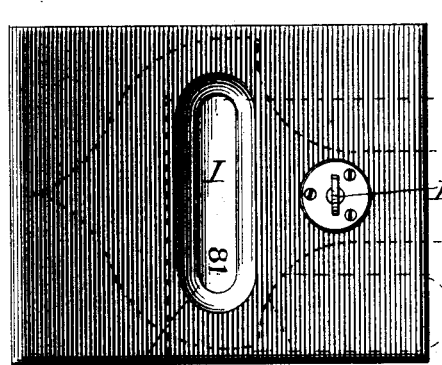
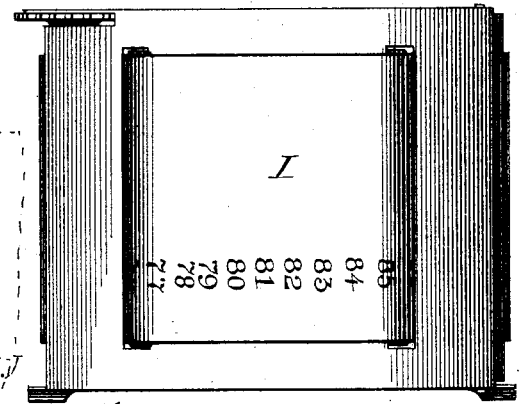
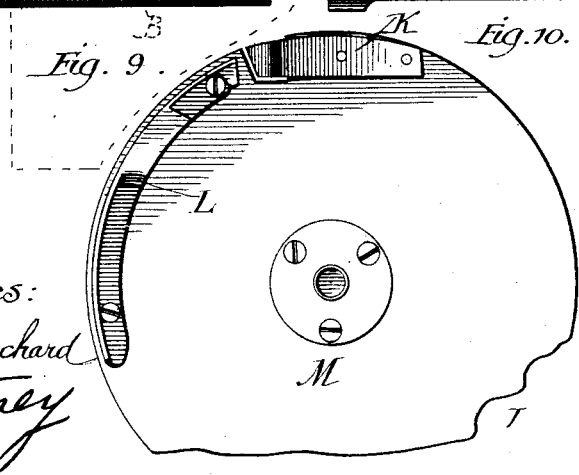
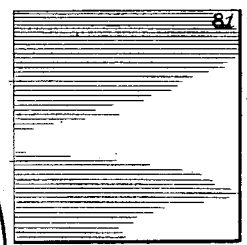
Witnesses: Inventor:
Frank Blanchard Frank Whitney
C. Whitney

UNITED STATES PATENT OFFICE.

FRANK WHITNEY, OF CHICAGO, ILLINOIS.

PHOTOGRAPHIC CAMERA.

SPECIFICATION forming part of Letters Patent No. 446,045, dated February 10, 1891.

Application filed August 12, 1889. Serial No. 320,547. (No model.)

*To all whom it may concern:*

Be it known that I, FRANK WHITNEY, a citizen of the United States, residing in the city of Chicago, in the county of Cook and State of Illinois, have invented new and useful Improvements in Photographic Cameras, of which the following is a specification.

This invention relates to photographic cameras, and is especially adapted for the use of amateurs, providing means for simplifying the operation and devices necessary in the art.

In my application for a patent on photographic cameras filed March 21, 1889, is shown the main features to which the improvements embodied in this invention relate.

The object of my invention is to improve the devices employed in operating a shutter, a magazine containing the negative-plates, a registering-paper in connection with the plates, and a shield or belt to prevent the plates escaping from the magazine. In the arrangement and operation of these parts consists the novelty of my invention. These objects I accomplish in the manner and by the means hereinafter described and claimed, reference being made to the accompanying drawings, in which—

Figure 1:
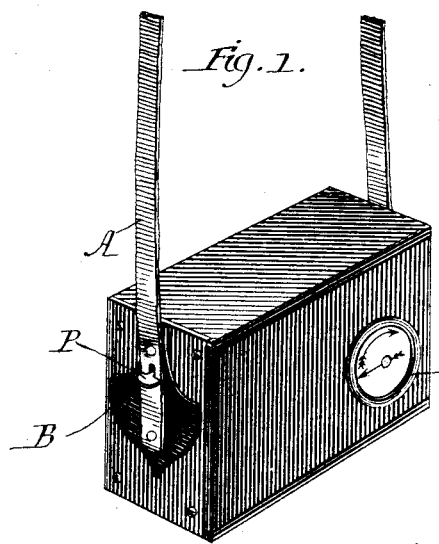
Figure 2:
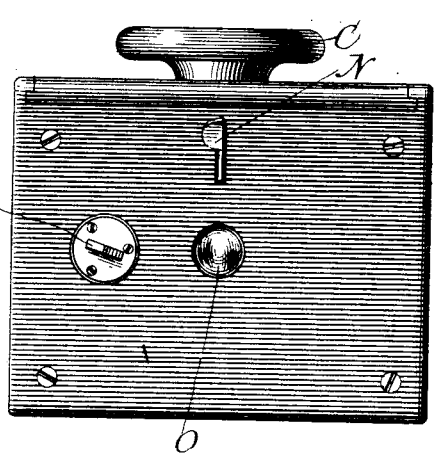
Figure 3:
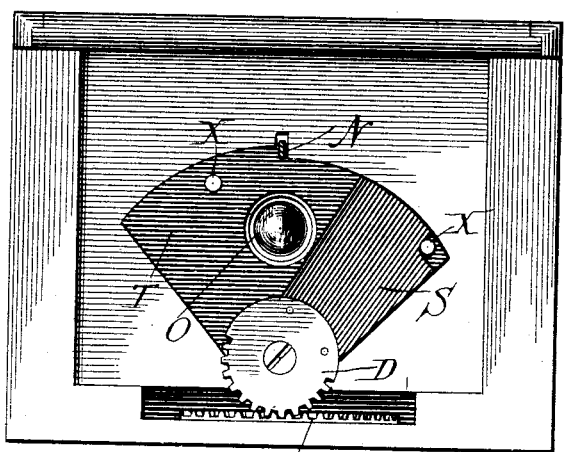
Figure 4:
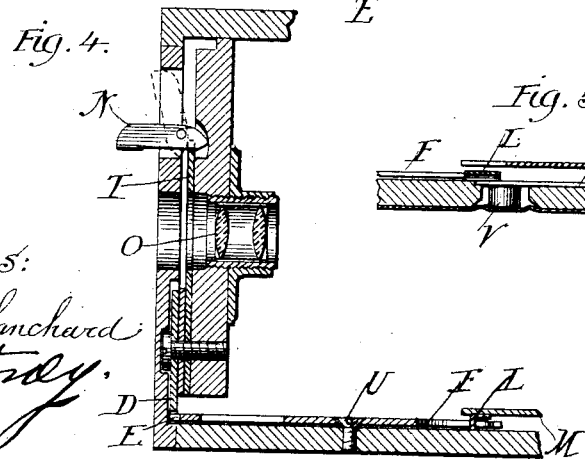
Figure 5:
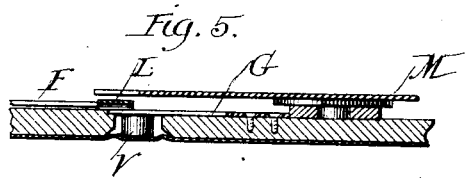

Figure 1 is the camera with shoulder-strap attached. Fig. 2 is the front end of camera-box, showing lens and time-stop and strap-button. Fig. 3 is the shutter. Fig. 4 is a cross-section of Fig. 2. Fig. 5 is a detail. Fig. 6 is a plan view of the bottom of the camera-box. Fig. 7 is the rear end of the camera-box, showing the numbered paper. Fig. 8 is the registering-paper and its support. Fig. 9 is the bottom disk of the revolving magazine, partially broken away. Fig. 10 is the numbered negative-plate.

In describing my invention I will refer to the drawings, in which A indicates the shoulder-strap pivoted to the camera by the button P, with the covering-pad B attached.

C is the knob for operating the plate-receptacle or revolving magazine.

D is a segment attached to the shutter-plate S.

E is a segment in gear with segment D, communicating motion to the shutter and pivoted at U with a lever-extension F.

G is the trip-spring, with the button V attached for releasing the shutter-lever and the revolving magazine.

H is a belt shielding the revolving magazine, as shown in Fig. 6. The magazine is not shown, as it is the same as I have shown in my application of March 21 last.

I is the registering-paper, with consecutive numbers arranged to show one number at slot J at each revolution of the magazine.

K is the spring-stop attached to the bottom disk of the magazine.

M is the lower disk of the revolving magazine.

N is the time-stop acting on the shutter.

O is the lens.

P is the button to which the shoulder-strap is attached.

S and T are the shutter-plates.

U is the pivot for the segment-lever which operates the shutter.

W is a stationary stop-pin, acting in conjunction with spring K to lock lever F and cam L to lock the magazine.

X and X are stop-pins on the shutter-plates.

Y is the spring which operates the shutter.

In describing the elements which constitute the features of my invention the camera may be carried by the shoulder-strap A across the shoulder and the camera hang loosely by the side of the operator. In this position the cover-pad B hides the lens-aperture, and a corresponding pad at the other end of the camera covers the registering-slot, as shown in Figs. 1 and 7. The covering thus produced prevents dust or rain entering these openings, and thereby dispenses with an extra outside covering for the camera. The pivot-point being at P uncovers the lens-opening by turning the camera (as it hangs by the strap on the operator's shoulder) one quarter-revolution, this being the position for the camera when an exposure is made, and when the camera is permitted to hang free it swings to the original position.

The exposure is made by pressing with the finger upon the button V, which releases the lever F, permitting the spring Y to draw the segment which operates the shutter-plates. Should a time-exposure be required, the stop N will be thrown down, as seen in Fig. 4, engaging the shoulder on the plate T, Fig. 3 and when the desired time has expired stop N (being a short pivoted lever) is pushed back, permitting the shutter to pass and cover the lens. The shutters S and T being substantially the same as shown and described in my previous application above referred to, I do not deem it necessary to describe them further at this time.

In Fig. 6, H represents a strap, which may be made of any suitable material, to shield the magazine and prevent the catching of the plates in the magazine on any projections which they might otherwise come in contact with, such as the plate, the registering-paper device, or other irregularities in the box.

The cam L is brought in contact, when the disk M is being revolved, with the lever F, and carries the lever against the stop-pin W, and the disk continues until the spring-stop K comes in contact with lever F, at which time both the shutter-lever and the disk are locked in this position, and the disk cannot be moved in either direction until released by pressure on the button V. This pressure on button V releases both the disk (which is the bottom of the magazine) and the lever F by its contact with the spring-stop K. Thus the exposure is made.

The registering-paper is operated by the revolving magazine, and is provided with consecutive numbers from 1 to 100, more or less, as may be required, and the negative-plates are correspondingly numbered.

In the operation of placing a negative for exposure a number is brought to the slot I, and the revolving of the paper is so timed that it corresponds with the number on the negative-plate exposed, and the name of the subject may be recorded on the paper opposite each number. It will be obvious that this will enable the operator, by reference to the register, to select any plate or plates for development which he may desire.

I have shown in Fig. 10 a single plate. (Not full size.)

This description is intended to explain the improvements which I claim, as follows:

1. In a photographic camera, the negative-plates numbered to correspond with the numbers on the registering-paper, and means for operating them in unison, substantially as described.

2. In a photographic camera, the shutter-plates S and T and the time-stop N, in combination with the segments D and E, substantially as described.

3. A shoulder-strap pivoted to the camera-box, provided with the covering-pad B, substantially as described.

4. The segments D and E, lever F, and releasing-spring G, for operating the shutter, as described.

5. In a camera provided with the revolving magazine, the shield H, substantially as described.

6. The disk of revolving magazine for negative-plates, provided with cam L and spring-stop K, substantially as described.

7. In a camera, the opening J, the registering-paper I, and covering-pad B, substantially as and for the purpose described.

8. The numbered negative-plate, Fig. 10, the shutter device, and the covering-pad B, substantially as described.

9. The disk M of a revolving negative-magazine, provided with the cam L, and the spring-stop K, operating to move the lever F and securely lock the same, substantially as described.

10. The spring G, with button V, operating to release the shutter device, and the revolving magazine, substantially as described.

11. In a camera, the pivoted segment E, lever F, and spring Y, in combination with shutter-plates, substantially as described In testimony whereof I affix my signature in presence of two witnesses.

FRANK WHITNEY.

Witnesses:
ALBERT H. ADAMS,
FRANK S. BLANCHARD.